United States Patent [19]

Bertrand et al.

[11] 4,429,098

[45] Jan. 31, 1984

[54] MODIFIED CRUDE TOULENE DIISOCYANATE TO OBTAIN POLYURETHANE WITH AN IMPROVEMENT IN HIGH RESILIENCY

[75] Inventors: Jean Bertrand, Lamorlaye; Michel Gaillard, Chantilly, both of France

[73] Assignee: Produits Chimiques Ugine Kuhlmann, Courbevoie, France

[21] Appl. No.: 412,730

[22] Filed: Aug. 30, 1982

[30] Foreign Application Priority Data

Sep. 25, 1981 [FR] France .............................. 81 18075

[51] Int. Cl.³ .............................................. C08G 18/10
[52] U.S. Cl. .............................. 528/59; 260/453 AR; 521/59
[58] Field of Search ................ 260/453 AR; 521/159; 528/59

[56] References Cited

U.S. PATENT DOCUMENTS

| 3,943,158 | 3/1976 | Dieterich et al. ....... 260/453 AR X |
| 3,959,329 | 5/1976 | Dieterich et al. ........... 260/453 AR |
| 4,051,166 | 9/1977 | Richter et al. ............... 260/453 AR |
| 4,055,548 | 10/1977 | Carleton et al. ...................... 528/59 |
| 4,169,175 | 9/1979 | Marans et al. ......................... 528/59 |
| 4,320,067 | 3/1982 | Von Bonin et al. ......... 260/453 AR |
| 4,340,712 | 7/1982 | Reichmann et al. ............ 528/59 X |

Primary Examiner—Lucille M. Phynes
Attorney, Agent, or Firm—Sigalos & Levine

[57] ABSTRACT

Modified crude toluene diisocyanate characterized by the fact that it is obtained by reaction first of a crude toluene diisocyanate with a polyol in such a quantity that the lowering of the isocyanate concentration of the crude toluene diisocyanate at the most amounts to about 2.0—NCO groups per kilogram of crude toluene diisocyanate and by the fact that in a second step the above reaction product is aged under heat application for such a temperature and period of time that the lowering of the isocyanate concentration of this reaction product at the most amounts to 0.4—NCO groups per kilogram of product. This modified crude toluene diisocyanate can be used for making high resiliency polyurethane foam with improved properties.

10 Claims, No Drawings

MODIFIED CRUDE TOLUENE DIISOCYANATE TO OBTAIN POLYURETHANE WITH AN IMPROVEMENT IN HIGH RESILIENCY

BACKGROUND OF THE INVENTION

The present invention concerns a crude (unpurified) toluene diisocyanate (TDI) modified in such a way that its use in the manufacture of polyurethane foams makes it possible to obtain foams having a high resilience and whose firmness, in particular, is improved.

The modified crude toluene diisocyanate is in the form of a prepolymer which has been made to undergo a heat aging process.

As is well known, TDI is prepared industrially by the phosgenation of one (preferably a mixture) toluene diamine or of one or a mixture of hydrochlorides of toluene diamines. During the course of this reaction, taking place in the presence of a solvent, some high molecular weight compounds are formed as a result of secondary reactions of the TDI's with themselves or with the toluene diamines at the same time as the TDI is being formed. These compounds principally consist of cyanamides, ureas, biurets, and dimerized and trimerized diisocyanates, as well as even more complex mixed compounds. They nevertheless have the common chemical characteristics of preserving one or more free and reactive —NCO groups. This phosgenation product obtained after elimination of the solvent contains a number of —NCO groups per kilogram falling between about 8.5 and 11.2.

Various advantages, both economical and technical; for instance a better resistance to bending fatigue and a greater ease of implementation, result from the use of a crude phosgenation product (from which the solvent has only been eliminated) as the polyisocyanate in the manufacture of polyurethane foams. The use of a crude TDI which is the undistilled phosgenation product or, as in the case of French Pat. No. 1,470,254, results from the mixture of purified TDI with the heavy residual compounds from the phosgenation, however, presents an important disadvantage due to its instability and poor keeping qualities. This drawback gives rise to the formation of secondary compounds which confer mediocre physical properties upon the foams being obtained, particularly as far as residual deformation following compression is concerned.

In order to remedy these drawbacks, various treatments of the crude TDI's have been proposed. In particular, French Pat. No. 2,253,771 can be cited, according to which the crude TDI is treated with a weak acid so as to convert the cyanamides. French Pat. No. 2,073,924 can also be cited, according to which part of the diisocyanate is trimerized in the presence of derivatives of guanidine.

Furthermore, it is known that the manufacture of flexible polyurethane foams having a high resilience, often defined by a sag factor above 2.5, remains difficult in spite of being well known. On one hand, stabilizers do not enter into the composition of the formulations; namely stabilizers such as surfactants resulting from alkylene oxide condensation with siloxanes, which are customarily used for the manufacture of flexible polyurethane foams, but only, if absolutely necessary, not very active silicone oils. On the other hand, the finished foam, above all in the case of continuous block casting, must not contain too large a quantity of closed cells which would result in a poor dimensional stability of the block.

SUMMARY OF THE INVENTION

The present invention provides modified crude TDI which not only possesses the known advantages inherent in crude TDI's, but also makes it possible to easily manufacture flexible foams having a high resilience with improved identation (sag) values.

Briefly, the present invention comprises a modified crude TDI and the method of making it. The method comprises first reacting crude TDI with a polyol in such a quantity that the lowering of the isocyanate concentration of the crude TDI at the most amounts to about 2 —NCO groups per kg of crude TDI, and preferably between 0.3 and 0.8 —NCO groups per kg of crude TDI, and then aging the prepolymer under heat application for a period of time sufficient to lower the isocyanate concentration of the prepolymer, at the most, about 0.4 —NCO groups per kilogram of prepolymer.

DETAILED DESCRIPTION

The initial crude TDI to be treated preferably possesses an isocyanate concentration which can vary between about 9 and 11 —NCO groups per kilogram. It is obtained directly from the phosgenation reaction after elimination of the solvent and eventually after partial extraction of pure TDI. Likewise to be considered as crude TDI herein is any mixture of pure TDI and heavy residual products from the phosgenation reaction making it possible to produce, in synthetic manner, a product possessing a number of free —NCO groups per kg in a suitable quantity in order to produce the modified crude TDI of this invention.

The polyols utilizable in the first step preferably have an equivalent molecular weight (EMW) of about 30 to 1000 and a functionality of 2 to 8 hydroxyl groups. EMW is understood to mean the quotient of the molecular weight of the polyol divided by its functionality. These polyols are now well known and correspond to those generally utilized in the manufacture of polyurethanes. By way purely of example, the following can be cited: glycerol, trimethylolpropane, hexanetriol, pentaerythritol, sorbitol, sucrose, the hexols, as well as the alkoxylation derivatives of these polyols.

The reaction of crude TDI with a polyol is well known per se, it being a prepolymerization reaction. This reaction preferably takes place under a dry atmosphere in a reactor equipped with an agitator and with temperature regulation means. Customarily, the polyol is added to the crude TDI having been preheated to a temperature below 70° C. Mixing then takes place under relatively slow agitation, while maintaining the reaction medium at a temperature generally below 100° C. for the time period necessary in order to obtain the desired —NCO titer. In the second step, the product having been obtained is stored under, preferably, an inert atmosphere, at a temperature usually between 50° and 110° C. for the time period necessary in order to bring the isocyanate concentration of the product of the first step to the selected titer for the final modified crude TDI. The time required in order to lower the isocyanate concentration of the prepolymer is a function of the temperature and can vary from about same hours to several days. The final —NCO titer can range from about 6.6 to 10.6.

The modified crude TDI having thus been obtained can be used under the conditions of any other TDI for the manufacture of flexible foams having a high resilience.

The invention will be further described in connection with the examples, which are set forth for purposes of illustration only.

EXAMPLE 1

A Grignard type reaction of 60 liter capacity is loaded with 50 kg of crude TDI having 9.92 —NCO groups per kg and having obtained by mixing some TDI rich in high molecular weight products with some pure TDI. The viscosity measured at 25° C. on a Brookfield viscosimeter, model LVT, velocity 60 t/min, needle No. 1, amounts to 15 cps. This isocyanate is heated to 42° C. under nitrogen. 1.690 kg of polyol triol, having a molecular weight of about 330 and a hydroxyl value of 505, which has been obtained by the propoxylation of glycerine, is then added. This temperature is maintained under agitation for 15 min, and the product is then drawn off into a cask whose surface is kept under nitrogen. After 24 hours, the isocyanate concentration of this crude TDI is determined by the AFNOR T 52 133 method and found to be 9.28 —NCO groups per kg, while the viscosity is 40 cps at 25° C. The cask is placed for 30 days into an oven regulated at 60° C. After this length of time, the final titer of this modified crude TDI has dropped to 9.03 —NCO groups per kg and the viscosity amounts to 51 cps at 25° C., with the conditions of measurement on the Brookfield viscosimeter being: needle No. 1—velocity 60 t/min.

Various foamy mixtures M are prepared at 22° C.±1 by mixing together the following constituents:

| CONSTITUENTS | TESTS | | | |
|---|---|---|---|---|
| (Parts by weight) | 1 | 2 | 3 | 4 |
| MIXTURES M | | | | |
| Polyol A | 0 | 93 | 90 | 90 |
| Polyol B | 0 | 0 | 2 | 2 |
| Polyol C | 100 | 0 | 0 | 0 |
| Water | 3.4 | 3.2 | 3.5 | 3.5 |
| Diethanolamine | 0 | 3.5 | 3.5 | 3.5 |
| Dimethylethanolamine | 0.3 | 0.3 | 0.4 | 0.4 |
| Catalyst Niax A 1 | 0 | 0.1 | 0 | 0 |
| Tegostab 4380 | 0 | 0.3 | 0.2 | 0.2 |
| Tegostab 2370 | 0.8 | 0 | 0 | 0 |
| Catalyst: stannous octaoate | 0.22 | 0.03 | 0.08 | 0.15 |
| pure TDI (2,4 isomer to 2,6 isomer = 80/20) | 42.0 | 0 | 0 | 0 |
| crude TDI (initial, at 9.92 —NCO groups per kg) | 0 | 51.6 | 0 | 0 |
| crude TDI after the first step (9.28 —NCO groups per kg) | 0 | 0 | 59.0 | 0 |
| final modified crude TDI | 0 | 0 | 0 | 60.7 |

Polyol A is a polyether triol having a hydroxyl value equal to 35, which has been ethoxylated and propoxylated with a ratio of propylene oxide to ethylene oxide equal to 86/14 and containing a proportion of primary hydroxyl groups of 80%.

Polyol B is a polyether triol having a hydroxyl value equal to 42, which has been ethoxylated and propoxylated with a ratio of propylene oxide to ethylene oxide equal to 25/75 and containing a proportion of primary hydroxyl groups of 45%.

Polyol C is a polyether triol having a hydroxyl value equal to 42, which has been propoxylated and ethoxylated with a ratio of propylene oxide to ethylene oxide equal to 86/14, but not containing any primary hydroxyl group.

Niax A 1 is a catalyst for polyurethane foams, based on bis (2-di-methylaminoethyl) ether.

Tegostab 4380 is a product based on silicone oil.

Tegostab 2370 is a surfactant, an alkylene oxide condensation product with siloxanes.

When the foamy mixtures, M, are homogeneous, the respective amounts of stannous octaoate are added. After renewed homogenization, the quantity of each corresponding TDI is introduced into each of the tests. After agitation for 8 sec, the formulations are poured into open molds having a cross section of 45 cm×45 cm and a height of 40 cm.

The foams obtained present the following characteristics:

| | TESTS | | | |
|---|---|---|---|---|
| | 1 | 2 | 3 | 4 |
| Density (weight per unit volume) in kg/m³ | 30 | 30.2 | 31.0 | 30.5 |
| Force in N applied to obtain an indentation (sag) of 50% | 230 | 85 | 115 | 225 |
| Sag factor | 2.1 | 2.7 | 3.0 | 2.6 |

The density (weight per unit volume) is determined according to AFNOR Standard T 56 107 and the indentation (sag) values are determined according to AFNOR Standard T 56 111. However, in order to be able to obtain a better characterization of the firmness of the foams, an indentation (sag) of 50% was selected in place of the usual 40% and determined on test specimens having a thickness of 10 cm instead of 5 cm.

The four tests lead to foams whose densities are practically the same. Test 1 is a foam of standard quality. Tests 2 and 3 yield foams of high elasticity grade, but which are difficult to obtain and have a low firmness. Test 4 with the crude TDI having been modified according to the invention yields a foam of high elasticity grade, which is easy to obtain and possesses an improved firmness.

EXAMPLE 2

The procedure of Example 1 is followed for the manufacture of the product of the first step. 24 hours after being drawn off into the cask, the product has a titer of 9.27 —NCO groups per kg and its viscosity amounts to 39 cps at 25° C. This product is then placed for 19 days, under nitrogen, into an oven regulated at 80° C.; after this length of time, the final titer of the modified crude TDI has dropped to 9.0 —NCO groups per kg and the viscosity amounts to 60 cps at 25° C.

Test 4 of Example 1 is reproduced utilizing this modified crude TDI in place of the modified crude TDI used therein and a foam of high elasticity grade is easily obtained, whose characteristics are the following ones:

Density (weight per unit volume): 32 kg/m³

Force applied to obtain an indentation (sag) of 50%: 210 N

Sag factor: 2.7

EXAMPLE 3

The procedure of Example 1 is followed for the manufacture of the product of the first step. 24 hours after being drawn off into the cask, the product has a titer of 9.26 —NCO groups per kg and its viscosity amounts to 36 cps at 25° C. This product is then placed for 8 days, under nitrogen, into an oven regulated at 100° C.; after this length of time, the final titer of the modified crude TDI has dropped to 8.98 —NCO groups per kg and the viscosity amounts to 58 cps at 25° C.

Test 4 of Example 1 is reproduced utilizing this modified crude TDI in place of the modified crude TDI used therein and a foam of high elasticity grade is easily obtained, whose characteristics are the following ones:

Density (weight per unit volume): 31 kg/m$^3$

Force applied to obtain an indentation (sag) of 50%: 230 N

Sag factor: 2.7

EXAMPLE 4

A Grignard type reactor of 60 liter capacity is loaded with 20 kg of crude TDI having 10.0 —NCO groups per kg. The viscosity measured at 25° C. on the Brookfield viscosmiter, model LVT, velocity 60 t/min—needle No. 1, amounts to 17 cps. This isocyanate is heated to 40° C. under nitrogen. 0.471 kg of polyol of the sorbitol type having been propoxylated until a molecular weight of about 700 was obtained and having a hydroxyl value equal to 498, is then added. This temperature is maintained under agitation for 15 minutes, and all of the product is then drawn off into a cask whose surface is kept under nitrogen. After 24 hours, the isocyanate concentration of this crude TDI is determined by the AFNOR T 52 133 method and found to be 9.52 —NCO groups per kg, while the viscosity is 30 cps at 25° C. The cask is then placed for 11 days into an oven regulated at 100° C. After this length of time, the final titer of this modified crude TDI has dropped to 9.22 —NCO groups per kg and the viscosity amounts to 46 cps, with the conditions of measurement on the Brookfield viscosimeter being: needle No. 1, velocity 60 t/min.

Test 4 of Example 1 is reproduced utilizing this modified crude TDI in place of the modified crude TDI used therein and a foam of high elasticity grade is easily obtained, whose characteristics are the following ones:

Density (weight per unit volume): 32.3 kg/m$^3$

Force applied to obtain an indentation (sag) of 50%: 135 N

Sag factor: 2.8

EXAMPLE 5

A Grignard type reactor of 60 liter capacity is loaded with 20 kg of crude TDI having 10.0 —NCO groups per kg and having been obtained by mixing some toluene diisocyanate rich in heavy products with some pure toluene diisocyanate. The viscosity measured on the Brookfield viscosimeter, model LVT, velocity 60 t/min—needle No. 1, amounts to 17 cps. This isocyanate is heated to 40° C. under nitrogen. 1.346 kg of polyol tetrol, which has been obtained by the polyaddition of 85% by weight of propylene oxide and then of 15% by weight of ethylene oxide onto some ethylene diamine until a molecular weight of about 3600 had been obtained and has a hydroxyl value equal to 62, is then added. This temperature is maintained under agitation for 15 min, and then all of the product is drawn off into a cask kept under nitrogen. After 24 hours, the isocyanate concentration of this crude TDI is determined by the AFNOR T 52 133 method and found to be 9.26 —NCO groups per kg, while the viscosity is 32 cps at 25° C. The cask is then placed for 6 days into an oven regulated at 100° C. After this length of time, the final titer of this modified crude TDI has dropped to 8.93 —NCO groups per kg and the viscosity amounts to 46 cps.

Test 4 of Example 1 is reproduced utilizing this modified crude TDI in place of the modified crude TDI used therein and a foam of high elasticity grade is easily obtained, whose characteristics are the following:

Density (weight per unit volume): 28.9 kg/m$^3$

Force applied to obtain an indentation (sag) of 50%: 162 N

Sag factor: 2.9

EXAMPLE 6

A Grignard type reactor of 60 liter capacity is loaded with 20 kg of crude TDI having 10.95 —NCO groups per kg and having been obtained by mixing toluene diisocyanate rich in heavy products with pure toluene diisocyanate. The viscosity measured on a Brookfield viscosimeter, model LVT, velocity 60 t/min—needle No. 1, amounts to 9 cps. This isocyanate is heated to 40° C. under nitrogen. 0.727 kg of polyol triol, having been obtained by the propoxylation of glycerine until a molecular weight of about 330 had been reached and having a hydroxyl value equal to 505, is then added. This temperature is maintained under agitation for 20 min, and then all of the product is drawn off into a cask whose surface is kept under nitrogen. After 24 hours, the isocyanate concentration of this crude TDI is determined by the AFNOR T 52 133 method and found to be 10.27 —NCO groups per kg, while the viscosity is 11 cps at 25° C. The cask is then placed for 3 days into an oven regulated at 100° C. After this length of time, the final titer of this modified crude TDI has dropped to 9.98 —NCO groups per kg and the viscosity amounts to 13 cps.

Test 4 of Example 1 is reproduced utilizing this modified crude TDI in place of the modified crude TDI used therein; except that 54.9 parts of modified crude TDI are then added instead of the 60.7 parts of Test 4. A foam of high elasticity grade is easily obtained, whose characteristics are the following one:

Density (weight per unit volume): 29.1 kg/m$^3$

Force applied to obtain an indentation (sag) of 50%: 130 N

Sag factor: 2.7

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The method of making a modified crude toluene diisocyanate comprising first reacting a crude toluene diisocyanate with a polyol in an amount such that the isocyanate concentration of the crude toluene diisocyanate is lowered at most up to about 2 —NCO groups per kilogram of crude toluene diisocyanate and then subjecting such reaction product to a temperature and for a time sufficient that the isocyanate concentration of such reaction product is lowered no more than about 0.4 —NCO groups per kilogram of reaction product.

2. The method of claim 1 wherein said crude toluene diisocyanate first reacted with the polyol is selected from (1) a mixture of at least one pure toluene diisocyanate and high molecular weight residual products resulting from the phosgenation of at least one toluene diamine or at least one toluene diamine hydrochloride, or (2) crude toluene diisocyanate obtained directly from phosgenation of at least one toluene diamine or at least one toluene diamine hydrochloride.

3. The method of claim 2 wherein the crude toluene diisocyanate first reacted with the polyol possesses an isocyanate concentration of about 9 to 11 —NCO groups per kilogram.

4. The method of claim 3 wherein said polyol first reacted with a crude toluene diisocyanate has a functionality of about 2 to 8 hydroxyl groups and an equivalent molecular weight of about 30 to 1,000.

5. The method of claims 1, 2, 3, or 4 wherein said reaction product is subjected to a temperature of from about 50° to 110° C. for a period of from about some hours to several days.

6. As a new product, the modified crude toluene diisocyanate prepared in accordance with the method of claim 1.

7. As a new product, the modified crude toluene diisocyanate prepared in accordance with the method of claim 2.

8. As a new product, the modified crude toluene diisocyanate prepared in accordance with the method of claim 3.

9. As a new product, the modified crude toluene diisocyanate prepared in accordance with the method of claim 4.

10. A modified crude toluene diisocyanate in the form of a prepolymer having an isocyanate concentration between about 6.6 to 10.6 —NCO groups per kilogram and being the reaction product obtained by first reacting a crude toluene diisocyanate having an isocyanate concentration of about 9 to 11 NCO grouups per kilogram selected from (1) a mixture of at least one pure toluene diisocyanate and high molecular weight products resulting from the phosgenation of at least one toluene diamine or at least one toluene diamine hydrochloride, or (2) crude toluene diisocyanate obtained directly from phosgenation of at least one toluene diamine or at least one toluene diamine hydrochloride, with a polyol having a functionality of about 2 to 8 hydroxyl groups and an equivalent molecular weight of about 30 to 1,000, said crude toluene diisocyanate and said polyol being present in an amount such that the isocyanate concentration of said crude toluene diisocyanate is lowered at most up to about 2 —NCO groups per kilogram of crude toluene diisocyanate, and then subjecting such reaction product to aging at a temperature of from about 50° to 110° C. for a period of from about some hours to several days such that the isocyanate concentration of such reaction product is lowered no more than about 0.4 —NCO groups per kilogram of reaction product.

* * * * *